Figure 1:
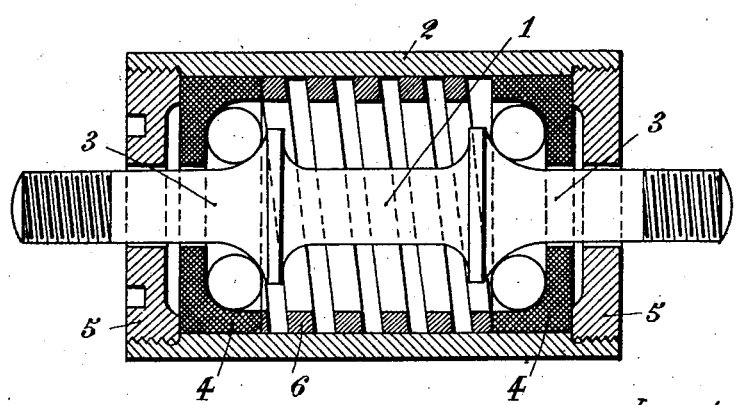

L. MIQUET.
ADJUSTABLE BALL BEARING.
APPLICATION FILED NOV. 13, 1919.

1,401,349.

Patented Dec. 27, 1921.
2 SHEETS—SHEET 1.

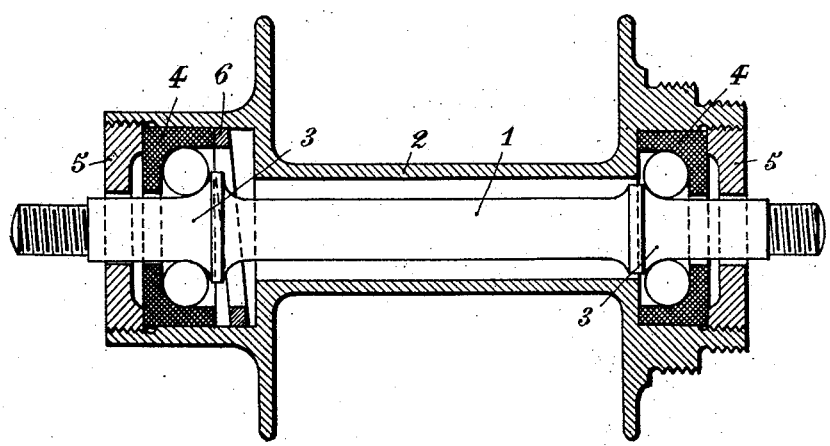
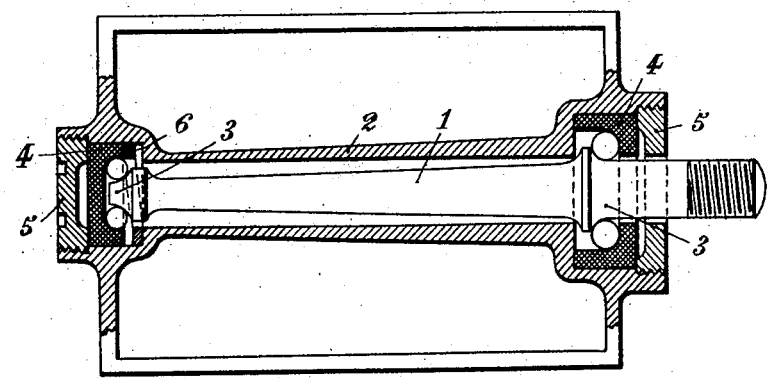

UNITED STATES PATENT OFFICE.

LOUIS MIQUET, OF NEUILLY-SUR-SEINE, FRANCE.

ADJUSTABLE BALL-BEARING.

1,401,349.      Specification of Letters Patent.      Patented Dec. 27, 1921.

Application filed November 13, 1919. Serial No. 337,898.

*To all whom it may concern:*

Be it known that I, LOUIS MIQUET, of Neuilly-sur-Seine, France, have invented certain new and useful Improvements in Adjustable Ball-Bearings, of which the following is a specification.

The invention relates to ball-bearings with so-called cones and cups of the type generally employed in the hubs of wheels mounted in forks for bicycles, motor cycles, tricycles and other vehicles, and also in pedals.

Figs. 1, 2, and 3 of the accompanying drawings are axial sections of three different bearings embodying my present invention.

1 designates the axle or spindle, 2 the casing or hub, 3 being the cones, 4 4 the cups and 5, 5 screwed rings or nuts fixing the cones and cups.

Referring in the first instance to Fig. 1, it will be seen that the cups 4, instead of being screw-threaded on their outer circumference are smooth and ground true after hardening, the boring of the casing being such that the cups can slide therein, but without any play.

A spring 6, of suitable strength, is placed under compression between the two cups, with its ends bearing on the cups themselves.

The length of this spring in relation to the distance which separates the two planes of rotation of the balls is such that when the latter are at the required distance apart for smooth running without play, the spring forces the cups outward against the screw rings 5, which lock the whole. Adjustment is effected by screwing or unscrewing one ring 5 or both.

Spurred washers may be inserted between the cups and the rings 5 in order to further secure the rigidity of the device.

Figs. 2 and 3 illustrate certain modifications with a view to simplification, but according to the same principle Fig. 2 representing a hub with a central part of small diameter, and Fig. 3 a pedal.

In these figures the modifications consist:—

1. In locking one of the cups against a shoulder provided in the casing, or by any other suitable means.

2. In inserting between the other cup, which so becomes the adjustable cup, and a support bound with the casing, a spring member 6, consisting of a grower, Belleville or other like washer instead of the complete spring 6 shown in Fig. 3, but fulfilling the same purpose.

It will be clear, without requiring special illustration, that this arrangement can easily be applied to bearings having adjustable cones with smooth instead of screw-threaded bores, and a spring or part of a spring interposed between the two cones urges them apart against their abutments (corresponding to the abutments 5), one of said abutments being fixed and the other adjustable toward or from the first.

It might be objected that strictly speaking, in view of the thrust, which is angular and always tends to push the adjustable cup or cups outward, the spring or parts of springs would appear to be superfluous: but obviously there would be, by the reactions, vibrations of the cup in the hub, capable in time of producing some play between them. For this reason, the spring or part of spring thrusting the adjustable cup against its abutment is interposed.

What I claim as my invention and desire to secure by Letters Patent of the United States is:—

1. In a ball bearing, the combination of a cone member and a cup member associated therewith to form an annular ball race, bearing balls between said members, a cylindrical bearing for one of said members allowing axial sliding movement of said member, an elastic member engaging said sliding member on one side to thrust it away from its associated member, and an adjustable abutment engaging the other side of said sliding member.

2. In a ball bearing, bearing balls, two associated members having opposing surfaces in engagement with said balls, one of said members being slidable axially relatively to the other, an axially-adjustable abutment engaging the axially-movable member on the side opposite to that engaged by the balls, and an elastic member engaging said axially-movable member and urging it toward said abutment and away from the member associated with said movable member.

3. In a ball bearing, a casing having an internal shoulder, an axially-adjustable abutment, an axially-slidable member located between said shoulder and said abutment, a spring interposed between said shoulder and said member and tending to separate them, and to press said member against said abutment, a relatively stationary companion member on the same side of said slidable member as said shoulder, said members having ball-engaging surfaces opposed to each other, and balls in engagement with said surfaces.

In witness whereof I have signed this specification in the presence of two witnesses.

LOUIS MIQUET.

Witnesses:
    CHAS. P. PRESSLY,
    GEUTIZON ROB.